United States Patent

[11] 3,602,474

| [72] | Inventors | John O. Deering;<br>Robert H. Green, both of Atlanta, Ga. |
|---|---|---|
| [21] | Appl. No. | 853,468 |
| [22] | Filed | Aug. 27, 1969 |
| [45] | Patented | Aug. 31, 1971 |
| [73] | Assignee | Lockheed Aircraft Corporation<br>Burbank, Calif. |

[54] PALLET RESTRAINT APPARATUS
10 Claims, 7 Drawing Figs.

[52] U.S. Cl. .................................................. 248/361,
    105/366 E
[51] Int. Cl. ....................................................... B65d 19/02
[50] Field of Search ......................................... 248/361,
    119, 361 B; 108/5; 105/369 A, 369 U, 368 T, 366

[56] References Cited
UNITED STATES PATENTS
2,705,782 4/1955 Boertzel ...................... 248/361 X
3,357,372 12/1967 Bader .......................... 105/369
3,424,410 1/1969 Galup .......................... 105/369 X
3,429,536 2/1969 Petry .......................... 248/361 X FOREIGN PATENTS
473,636 3/1929 Germany .................... 248/361 B Primary Examiner—Chancellor E. Harris
Attorneys—Roger T. Frost and George C. Sullivan ABSTRACT: A pallet for use in conjunction with pallet restraint rails which may be mounted in a vehicle such as an aircraft and which provide guidance and retaining support for the pallet. The pallet includes one or more restraint devices which are selectively movable into engagement with the restraint rails to secure the pallet in a desired position. The restraint device includes an elastomeric cushion which is deformably pressed against the rail to restrain the pallet from vertical or vertical and lateral movement relative to the restraint rails.

PATENTED AUG 31 1971

INVENTORS.
JOHN O. DEERING
ROBERT H. GREEN
BY George... Sullivan
Agent
Roger T. Frost
Attorney

PATENTED AUG 31 1971 3,602,474

INVENTORS.
JOHN O. DEERING
ROBERT H. GREEN
BY George C. Sullivan
Agent
Roger T. Frost
Attorney

PATENTED AUG 31 1971

INVENTORS.
JOHN O. DEERING
ROBERT H. GREEN
BY George C Sullivan
Agent
Roger T. Frost
Attorney

PALLET RESTRAINT APPARATUS

This invention relates in general to pallets and in particular to a pallet including a pallet restraint apparatus which is capable of being restrained in place against horizontal and vertical movement.

Pallets and palletized loads are becoming increasingly popular to facilitate the rapid loading and unloading of transport aircraft, ships, trucks, and the like. A typical use of pallets in a palletized cargo system requires the use of pallets having predetermined standard dimensions to enable the pallets to be received interchangeably in a particular location. Such pallets either may contain cargo for transportation and delivery or may support some relatively permanent attachment such as, for example, a number of aircraft-type seating units so that a cargo transport aircraft can be rapidly converted for passenger use simply by installing a number of seat pallets.

A number of contemporary types of cargo aircraft embody what is known as a rail restraint system in the cargo compartment, wherein one or more pairs of rails spaced apart approximately the width of a pallet define a location for receiving pallets. Once a pallet is positioned between the two rails, the pallet must be restrained in place to prevent unwanted displacement and vibration of the pallet. Among the desirable features which a pallet restraint apparatus should have are ease and rapidity of operation without special tools or separable parts which may become lost, the ability to restrain the pallet anywhere along the restraint rails without being limited to a fixed number of predetermined restraint locations, and the ability to provide a resilient or vibration dampening connection with the restraint rail.

Accordingly, it is an object of this invention to provide an improved pallet restraint apparatus.

It is another object of this invention to provide a pallet restraint apparatus for use with pallet-restraining rails.

It is still another object of the present invention to provide a pallet restraint apparatus capable of engaging the rail at an infinite number of positions therealong.

It is a further object of the present invention to provide a pallet restraint apparatus which restrains the pallet from both vertical and lateral movement with respect to a restraining rail.

It is another object of the present invention to provide an improved pallet including a pallet restraint apparatus for selectively restraining the pallet in place with respect to a restraining rail.

Other objects and many of the attendant advantages of the present invention will become readily apparent from the following specification and the drawing in which.

Stated generally, the present invention includes one or more snubber members positioned along the rail-confronting sides of a pallet. The snubber member is movable to a first position, wherein the member is aligned with a restraint flange along a side of the pallet and is not contacting a restraining rail, and to a second position where a resilient portion of the snubber member engages the restraining rail to restrain the pallet in place.

Figure 1:
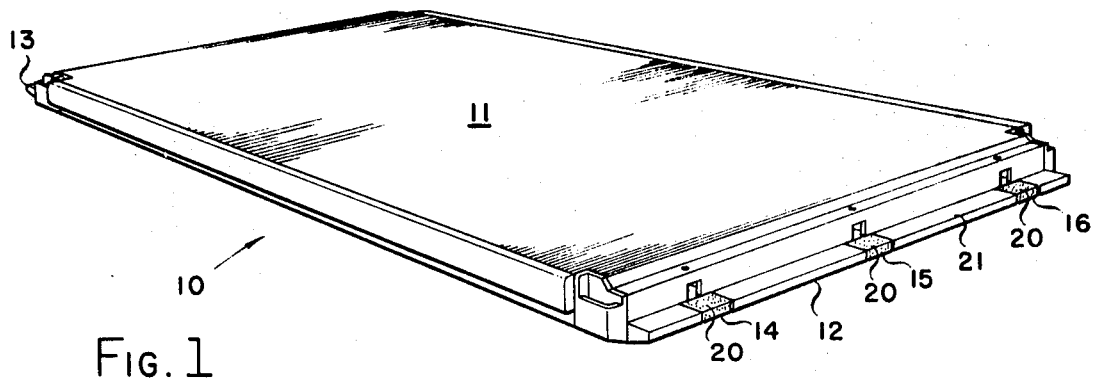
FIG. 1 shows an isometric view of a pallet equipped with restraint apparatus according to an embodiment of the present invention.
Figure 2:
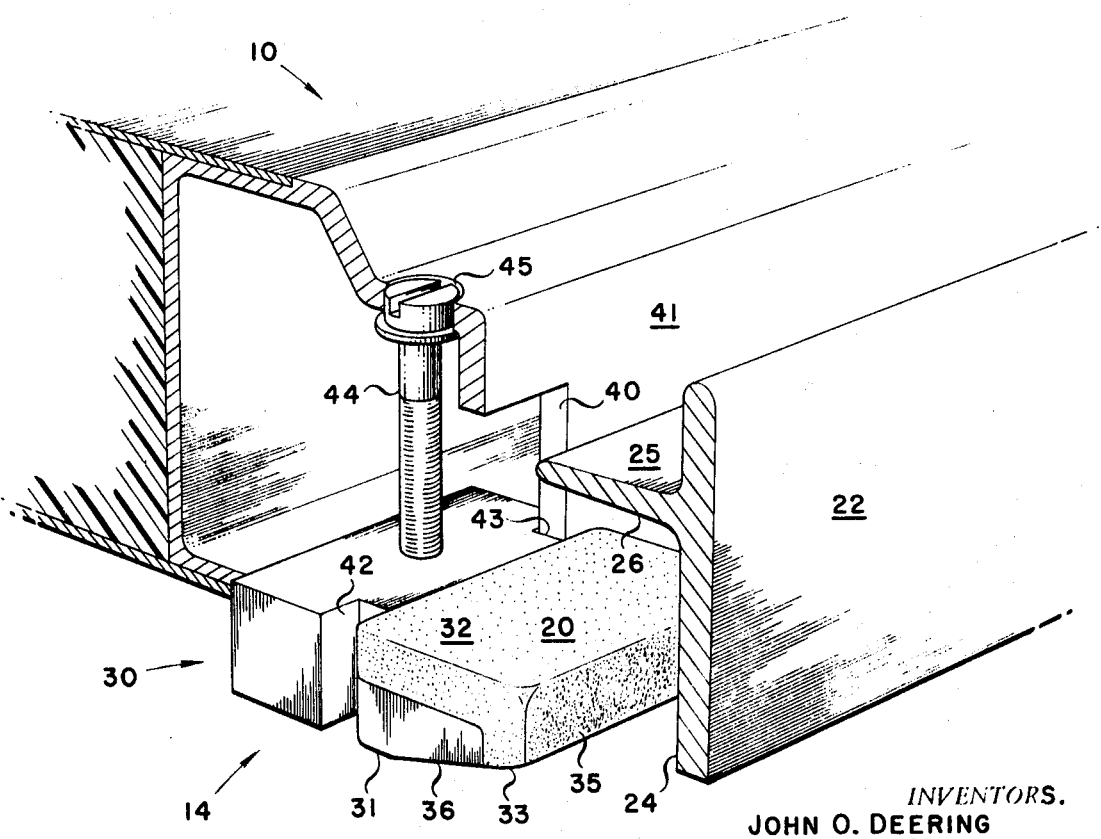
FIG. 2 shows a partially broken away isometric view of one of the snubbers depicted in FIG. 1, along with a length of restraint rail.

Referring next to FIGS. 1 and 2 for a more detailed explanation of an embodiment of the present invention, there is shown generally at 10 a pallet having a load-carrying surface 11 and a restraint flange 12 extending along one side of the pallet. A similar restraint flange 13 extends along the opposite side of the pallet 10. Three snubber members 14, 15 and 16 are mounted in the restraint flange 12, with these snubber members being shown in the fully retracted position in FIG. 1 so that the upper surfaces 20 of each snubber member are flush with the upper surface 21 of the restraint flange. The restraint flange 13 also is provided with one or more snubber members.

One of the pair of restraint rails which guides and positions the pallet 10 in a cargo compartment is shown at 22. The restraint rail 22 includes a vertical wall member having a side 24 facing the pallet 10 and an outwardly extending flange 25 having an under side 26 which overhangs the restraint flange 12 of the pallet. The two sides 24 and 26 define a passageway through which the restraint flange 12 moves as the pallet 10 is positioned between the restraint rails. It is understood, of course, that the other restraint rail (not shown), which is adjacent the restraint flange 13 on the opposite side of the pallet, has a corresponding wall member and flange forming a similar passageway for the restraint flange 13. The weight of the pallet is supported by any suitable apparatus such as rollers or the like, forming no part of the present invention, for longitudinal movement along a path defined by the pair of restraint rails.

Figure 3:
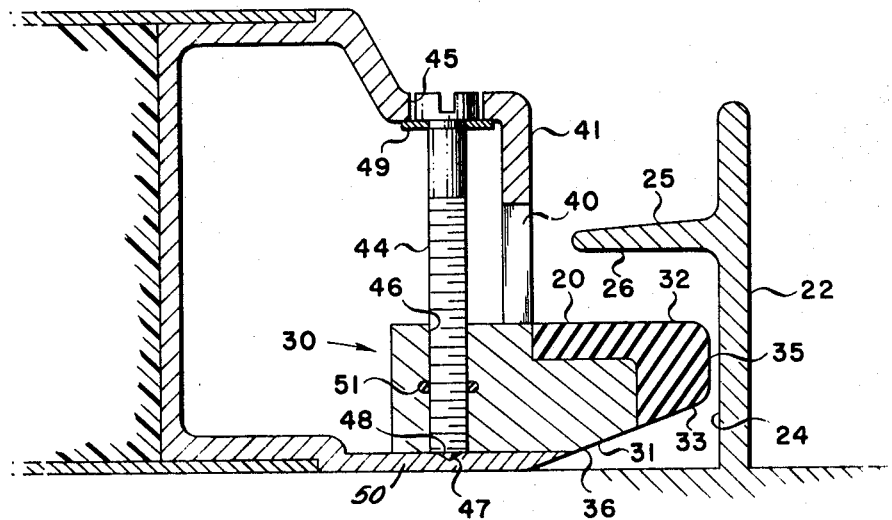
FIG. 3 shows a sectional elevation view of the snubber depicted in FIG. 2, as released from the restraint rail.
Figure 4:
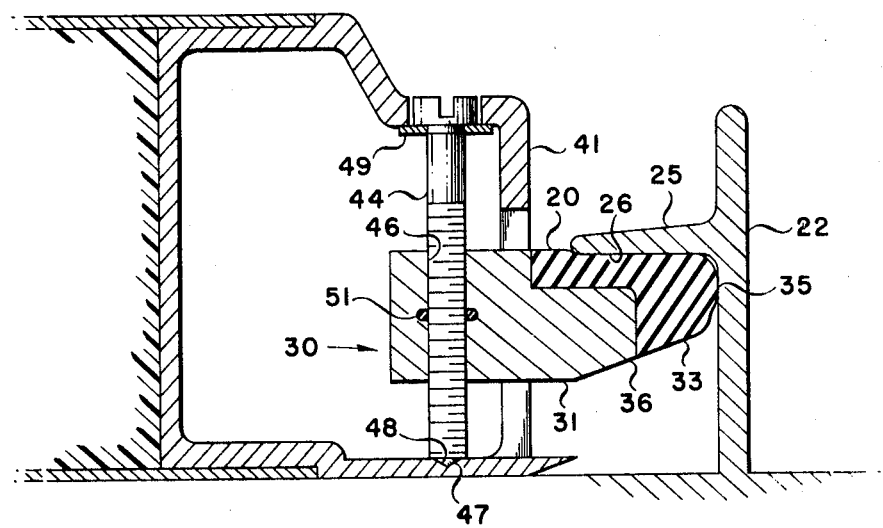
FIG. 4 shows the snubber of FIG. 3 engaging the restraint rail.

Each of the snubber members, such as snubber member 14, includes a rigid block 30 in which a portion of the upper surface at the end of the block facing the restraint rail 22 is cut away to define a toe 31. A slipper 32 made of a suitable resilient material such as rubber or another elastomer is secured to the toe 31 by the use of an adhesive or by another appropriate attachment technique. In the embodiment of FIGS. 2–4 the slipper 32 has an upper surface 20 facing the side 26 of the flange 25 and also has an end portion 33 depending downwardly to cover the outer end of the toe 31. This end portion 33 of the slipper has a vertical surface 35 facing the side 24 of the restraint rail 22. The underside of the end portion 33 and outer end of the toe 31 are beveled at 36 as required to conform the configuration of the snubber member 14 to the configuration of the restraint flange 12 when the snubber member is in the fully retracted position as shown in FIGS. 1 and 3.

The snubber member 14 is mounted for limited vertical movement in an opening 40 contained in the side member 41 of the pallet 10. A pair of slots 42 and 43 is formed in the block 30 to receive the vertical walls which define the opening 40, so that the snubbber member is restrained from substantial movement in any direction other than vertical.

A bolt 44 mounted for unrestricted rotation in a hole 45 contained in the side member 41 extends downwardly in threaded engagement with a hole 46 contained in the block 30. The free end 47 of the bolt 44 is received in a recess 48, and a retaining member 49 is provided at the other end of the bolt to prevent the bolt form being inadvertently withdrawn from the pallet. A frictional device such as the grommet 51 engages the threads of the bolt 44 at some location along the extent of the hole 46 to prevent unwanted turning of the bolt.

The operation of the embodiment described thus far is apparent from an examination of FIGS. 3 and 4. The dimensions of the slipper 32 are chosen so that there is ample clearance between the upper surface 20 and the vertical surface 35 and the corresponding confronting sides of the restraint rail 22. Once the pallet 10 is positioned where desired, the bolt 44 is rotated to elevate the block 30 to the position shown in FIG. 4 wherein the upper surface 20 snugly engages the lower side of 26 of the restraint rail flange 25 to restrain the pallet form vertical movement. The upward force of the slipper 22 against the side 26 causes the end portion 33 of the slipper to deform laterally so that the vertical side 35 is brought into engagement with the side 24 of the restraint rail 22 to restrain the pallet from lateral movement. It will be understood, of course, that the other snubber members contained in the restraint flanges 12 and 13 are also actuated to engage the restraint rails. The use of a resilient material for the slipper 32 eliminates or minimizes the transmission of vibration into the pallet through the restraint rails. The vertical force imposed by the restraint rail onto the snubber member 14 is transmitted through the bolt 44 into the base 50 of the pallet through the engagement of the bolt end 47 with the recess 48. The vertical force of the restraint also induces in the snubber member 14 a bending moment tending to rotate the snubber member inwardly of the pallet side member 41. This bending moment, which could cause the bolt end 47 to become unseated from the recess 48, is counteracted by contact of the sides of the slots 42 and 43 with the side member 41, such contact being permitted by a slight bending of the bolt 44 under a restraint bending moment. When it is desired to disengage the pallet from the restraint rail, the bolt 44 is rotated to lower the block 30 to the position shown in FIG. 3 so that the upper surface 20 is withdrawn form the side 26. The resilient characteristics of the slipper 32 cause the vertical side 35 thereof to withdraw from contact with the side 24 of the restraint rail.

Figure 5:
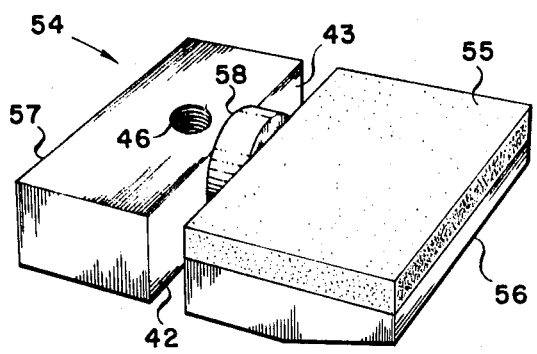
FIG. 5 shows an isometric view of a snubber according to another embodiment of the present invention.

The snubber member 54 shown in FIG. 5 can be used as an alternative to the snubber member 14. This snubber 54 differs from 14 by having the resilient slipper 55 along only an upwardly facing surface of the toe 56. When the snubber member 54 is operated to place the slipper 55 in contact with the restraint rail, there is no lateral engagement of the rail corresponding to the contact between the end portion 33 and the sides 24 as shown in FIG. 4. Accordingly, retention against lateral movement is obtained by the snubber member 54 only through the frictional contact between the slipper 55 and the side 26 of the restraint rail. This degree of lateral support is adequate for many purposes, however, and the embodiment depicted in FIG. 5 is somewhat less expensive to manufacture than that of FIGS. 2-4. It is noted also that the segment of the snubber member 54 which joins the block 57 and the toe 56 may be rounded as at 58 to facilitate the vertical movement of the snubber member within the opening 40.

Figure 7:
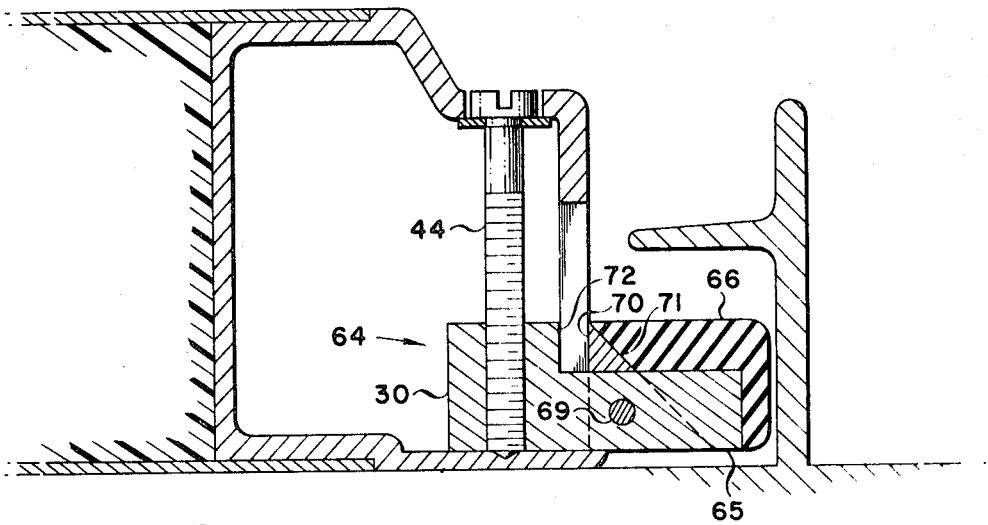
FIG. 7 shows a section view taken along line 7—7 of FIG. 6, with the snubber mounted in a pallet.
Figure 6:
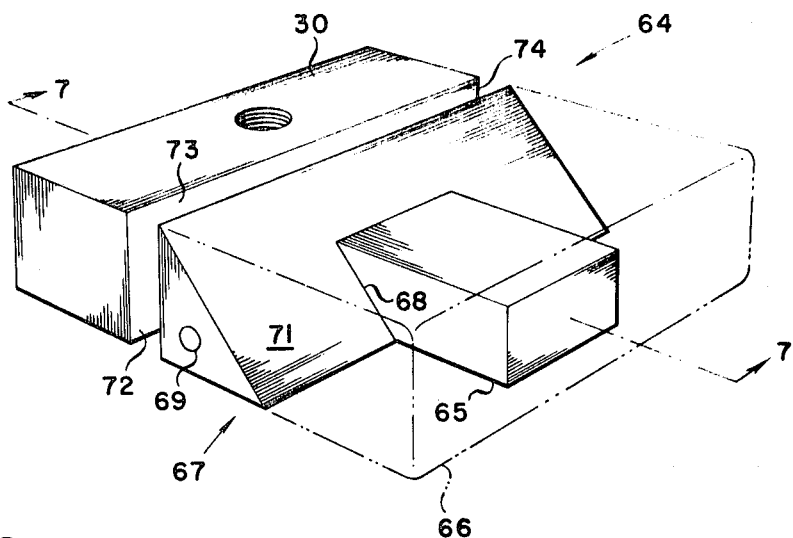
FIG. 6 shows an isometric view of a snubber according to yet another embodiment of the present invention.

The snubber member 64, shown in FIGS. 6 and 7, can be used as another alternative to the snubber members 14 and 54. The width of the end portion 65 of the snubber member 64 is substantially less than the width of the block 30. A saddle member 67 having a portion cut away at 68 is positioned over the end portion 65 and is retained thereon with a pin 69 which extends through coaxial holes contained in the saddle member and the end portion. The cutaway portion 68 is dimensioned with respect to the end portion 65 so that the saddle member fits on the end portion 65 snugly and with substantially no relative movement. A resilient slipper 66 which is substantially as wide as the saddle member 67 is disposed on the end portion 65 to abut the saddle member.

The saddle member 67 is shaped like a triangle to present a vertical side 70 and a diagonal side 71. A correspondingly shaped side of the slipper 66, shown in phantom lines in FIG. 6, abuts the side 71. The side 70 confronts and is space apart form the side 72 of the block 30 to define the slots 73 and 74, which guide the snubber member 64 for vertical sliding movement and which also permit the snubber member to receive the bending moment imposed when the snubber member engages the overhanging portion of the restraint rail.

The operation of the embodiment shown in FIGS. 6 and 7 is similar to that of the embodiment in FIGS. 2-4, with the resilient slipper 66 contacting both the underside 26 and the vertical side 24 of the restraint rail to restrain the pallet from unwanted vertical and lateral movement. With the embodiment of FIGS. 6 and 7, however, the force causing the lateral deformation of the slipper 66 is enhanced by the lateral component of the force exerted on the slipper by the diagonal side 71 of the saddle member. Accordingly, enhanced lateral restraint is obtained through the use of the embodiment of FIGS. 6 and 7.

If the mechanism for raising and lowering the snubber member, such as the bolt 44, should become inoperative while the snubber member is in the raised or rail-engaged position, the pin 69 can be removed from its engagement in the saddle member and the end portion 65 simply by driving the pin out with a suitable rod or punch. It can be observed from FIG. 7 that enough clearance exists between the side member 41 of the pallet and the end of the flange 25 to permit such removal of the pin 69 in an emergency. Once the pin is removed, the vertical side 70 is no longer held in contact with the side member 41 of the pallet and the bending moment imposed by the restraint rail acts entirely on the end portion 65 of the snubber member; this moment will unseat the bolt 44 from the recess 48 so that the snubber assembly can be moved laterally into the pallet at least to an extent which disengages the slipper 66 from engagement with the restraint rail. This feature of the embodiment shown in FIGS. 6 and 7 permits pallet removal without inflicting serious damage either to the pallet or to the restraint rail in the event that the pallet restraint apparatus becomes jammed such as through dirt fouling of the threads of the bolt 44.

It will be understood that various changes in the designs, materials, steps, and arrangements of parts, which have been described and illustrated in order to explain the nature of the present invention, may be made by those skilled in the art without departing from the principles and the scope of the invention.

What is claimed is:

1. Pallet apparatus for selective restraint with a pair of pallet restraint rails each of which has first and second surfaces facing the pallet at substantially different angles each to the other to provide abutments for restraining the pallet, comprising:
   a pallet;
   said pallet including a first restraint member extending along a first side of said pallet and a second restraint member extending along a second side of said pallet, each of said restraint members facing at least one surface of a respective restraint rail in spaced-apart relation when said pallet is positioned between the pair of restraint rails;
   each of said first and second restraint members having at least one snubbing member selectively movable to a first position in which said snubbing member abuts said one restraint rail surface and to a second position where said snubbing member is withdrawn from said one surface;
   said snubber member including means operative to move laterally of said selective movement to abut the other surface of the respective restraint rail responsive to said snubber member abutment of said one surface, said laterally movable means being operative to withdraw from abutment with said other surface when said snubber member is withdrawn from abutment with said one surface.

2. Apparatus as in claim 1, wherein said snubber member includes a restraint rail abutting means which is resiliently deformable by abutment with said one surface to be laterally moved into concurrent abutment with said other surface, said abutting means withdrawing from abutment with said second surface by resiliently reassuming an undeformed shape when said snubber member is withdrawn from abutment with said one surface.

3. Pallet apparatus capable of being received between a pair of restraint rails for selective retention, comprising:
   a pallet;
   said pallet including a first fixed restraint member disposed along and extending a distance outwardly of a first side of said pallet, and including a second fixed restraint member disposed along and extending a distance outwardly of a second side of said pallet,
   said first and second sides of said pallet being the pallet sides which confront respectively each of the restraint rails when the pallet apparatus is received between the pair of restraint rails;
   at least one snubbing member mounted in each of said first and second restraint members for movement between a rail contacting position whereat said snubbing member abuts a portion of the respective restraint rail and to a retracted position whereat said snubbing member is withdrawn from restraint rail contact to be at least partially received within said restraint member; and moving means interconnected between said restraint member and said snubbing member and operable to apply force to said snubbing member for selectively positively moving said snubbing member to said rail contacting position to restrain the pallet apparatus from movement and to move said snubbing member to said retracted position.

4. Apparatus as in claim 3, wherein:

said snubbing member is mounted for substantial vertical movement between said retracted position and said rail contacting position to place said snubbing member into abutting contact with a restraint rail portion which overhangs said restraint member.

5. Apparatus as in claim 4, wherein:

said snubbing member comprises a rigid portion extending outwardly of a pallet side and connected to said moving means for vertical movement thereby;

said outwardly extending rigid portion having an upwardly facing surface; and a resilient member disposed on said upwardly facing surface of said rigid portion to be in abutting contact with the overhanging portion of the restraint rail when said rigid portion is placed in the rail-engaging position by said moving means.

6. Apparatus as in claim 5, wherein:

said rigid portion includes a wall member extending upwardly from said upwardly facing surface at the side thereof which is remote of an upstanding portion of the restraint rail;

said upwardly facing surface terminating in a downwardly depending surface at the side thereof which is adjacent the upstanding portion of the restraint rail;

said resilient member having an upwardly facing portion which extends from said wall member along said upwardly facing surface and beyond the termination thereof to a point whereat said resilient member is adjacent but not contacting the upstanding portion of the restraint rail member, said resilient member additionally extending downwardly from said upwardly facing surface to form a resilient mass which is in contact with said downwardly depending surface and which presents an upright surface for abutment with the upstanding portion of the restraint rail member, so that when said rigid portion is moved to the rail contacting position resilient deformation of the resilient member caused by the force applied to said upwardly facing surface by the overhanging portion of the restraint rail causes said upright surface to be forced into abutment with the upstanding portion of the restraint rail.

7. Apparatus as in claim 3, wherein:

said snubbing member comprises a restraint-rail-contacting portion laterally offset from the point on said snubbing member to which force is applied by said moving means, so that a bending moment is imposed on said snubbing member when in said rail-contacting position;

said snubbing member positioned to contact said fixed restraint member to impose on said snubbing member a second bending moment which opposes the first-mentioned bending moment.

8. Apparatus as in claim 7, wherein:

said snubbing member includes guide slot means; and said fixed restraint member has guide wall means which are received in said guide slot means to define the movement of said fixed restraint member between the rail contacting position and the retracted position, said guide wall means positioned to contact said guide slot means for binding engagement therein when a bending moment is imposed on said snubbing means by restraint rail contact so that such binding engagement establishes the second bending moment.

9. Apparatus as in claim 3 and capable of selective engagement with a pair of restraint rails each of which has a first and a second surface facing the pallet, wherein:

said snubbing member comprises rigid support means extending outwardly of a pallet side and operatively connected to said moving means for movement along a path having a component of movement toward and away from at least one of the first and second surfaces of a respective restraint rail;

said rigid support means including a force transmitting surface positioned to face both of the first and second surfaces of such respective restraint rail; and a resilient member disposed on said rigid support means in contact with said force-transmitting surface, said resilient member positioned to be moved into abutment with at least one of such restraint rail surfaces when said snubbing member is moved to the rail contacting position and to be resiliently urged into abutment with both of such restraint rail surfaces by force applied to said resilient member by said force-transmitting surface.

10. Apparatus as in claim 9 and capable of selective engagement with a pair of restraint rails each of which has an upstanding portion defining a first side facing a pallet received therebetween and an overhanging portion defining a second side which overhangs said restraint member of a pallet received therebetween, wherein:

said rigid support means includes a shank member extending outwardly from the pallet side and terminating beneath the overhanging portion of the restraint rail;

a saddle member disposed on said shank member, the width of said saddle member as measured parallel with the pallet side being greater than the width of said shank member;

said saddle member having a surface which diagonally confronts both of the first and second restraint rail surfaces and which comprises said force transmitting surface; and said resilient member being supportingly received on said shank member and on said diagonally confronting surface, so that movement of said snubbing member into said restraint-rail-contacting position causes said shank member and said diagonally confronting surface to forcibly urge said resilient member into abutment with both of the first and second sides of the restraint rail.